United States Patent [19]
Alm et al.

[11] Patent Number: 5,779,431
[45] Date of Patent: *Jul. 14, 1998

[54] TRANSPORTING APPARATUS AND METHOD

[75] Inventors: Stephen D. Alm, Germantown; Andrew J. Alm; John M. Cullum, both of Memphis, all of Tenn.

[73] Assignee: Vulcan International, Inc., Olive Branch, Miss.

[*] Notice: The term of this patent shall not extend beyond the expiration date of Pat. No. 5,529,454.

[21] Appl. No.: 664,540

[22] Filed: Jun. 17, 1996

Related U.S. Application Data

[63] Continuation of Ser. No. 306,188, Sep. 13, 1994, Pat. No. 5,529,454.

[51] Int. Cl.$^6$ ........................................... B60P 3/12
[52] U.S. Cl. .................. 414/786; 414/478; 414/480; 414/494; 414/563
[58] Field of Search ................... 414/471, 476–480, 414/491, 494, 498, 500, 549, 556, 559, 563, 786

[56] References Cited

U.S. PATENT DOCUMENTS

| | | | |
|---|---|---|---|
| 2,786,590 | 3/1957 | Edwards et al. | 414/477 |
| 5,013,209 | 5/1991 | DeMichele et al. | 414/563 |
| 5,249,909 | 10/1993 | Roberts et al. | 414/476 |

FOREIGN PATENT DOCUMENTS

| | | | |
|---|---|---|---|
| 3616642 | 11/1987 | Germany | 414/549 |

*Primary Examiner*—James W. Keenan
*Attorney, Agent, or Firm*—Niro, Scavone, Haller & Niro

[57] ABSTRACT

An apparatus mountable to a transporting vehicle chassis for transporting another vehicle including a platform pivotally mounted to the chassis which includes a deck for carrying the vehicle, and a carriage located on and movable along the platform. A telescoping boom is connected to the carriage, and has a free end with a vehicle lift device, which engages the vehicle to be transported. Power actuators are provided to move the platform from a loading position to a transport position, and for moving the carriage and for raising or lowering the vehicle lift mechanism.

1 Claim, 11 Drawing Sheets

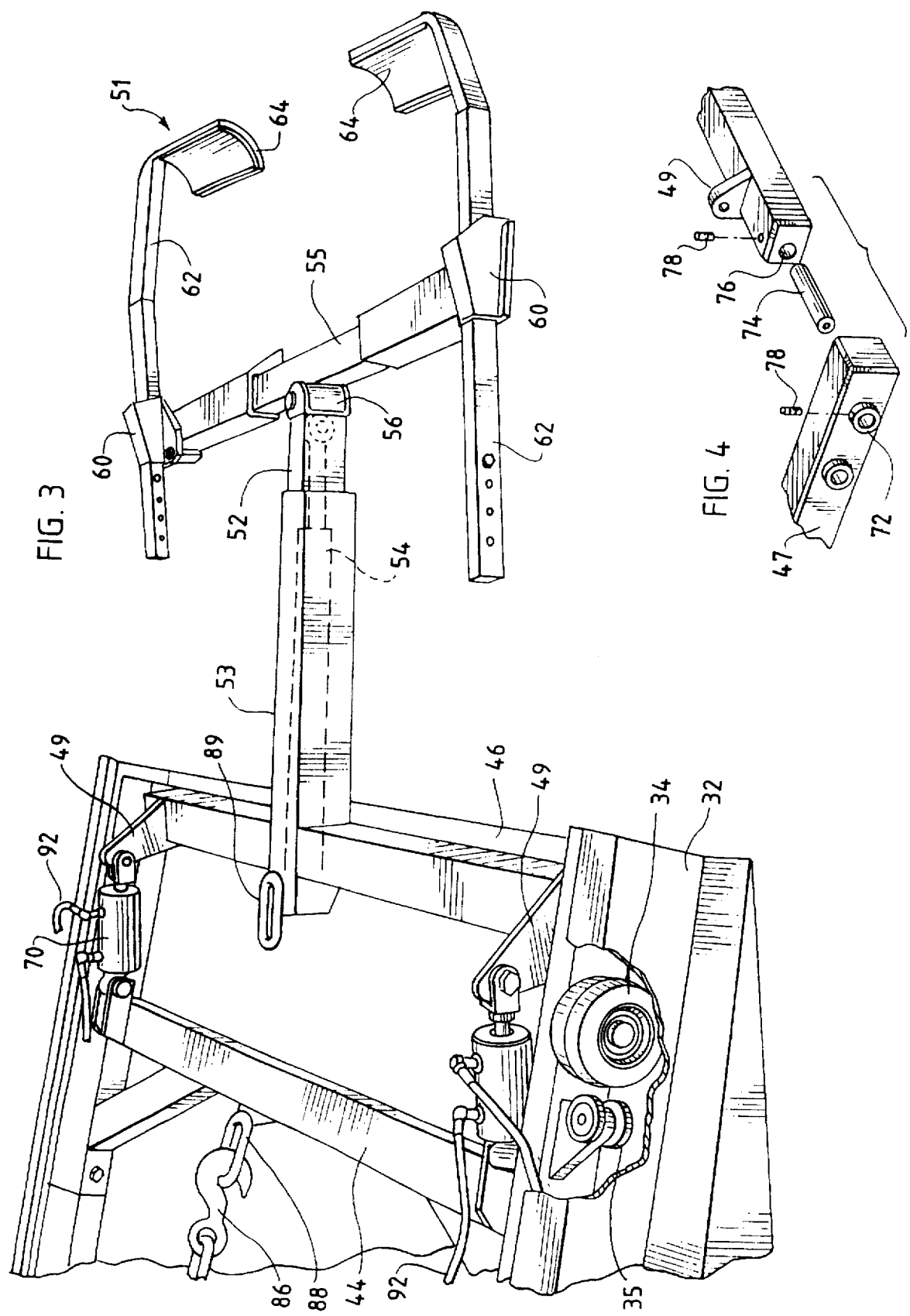

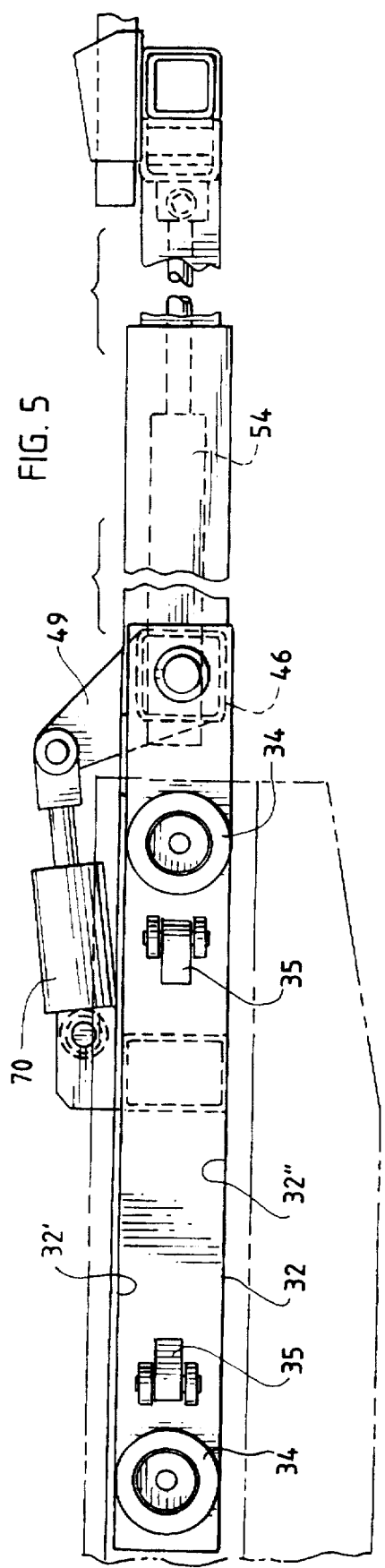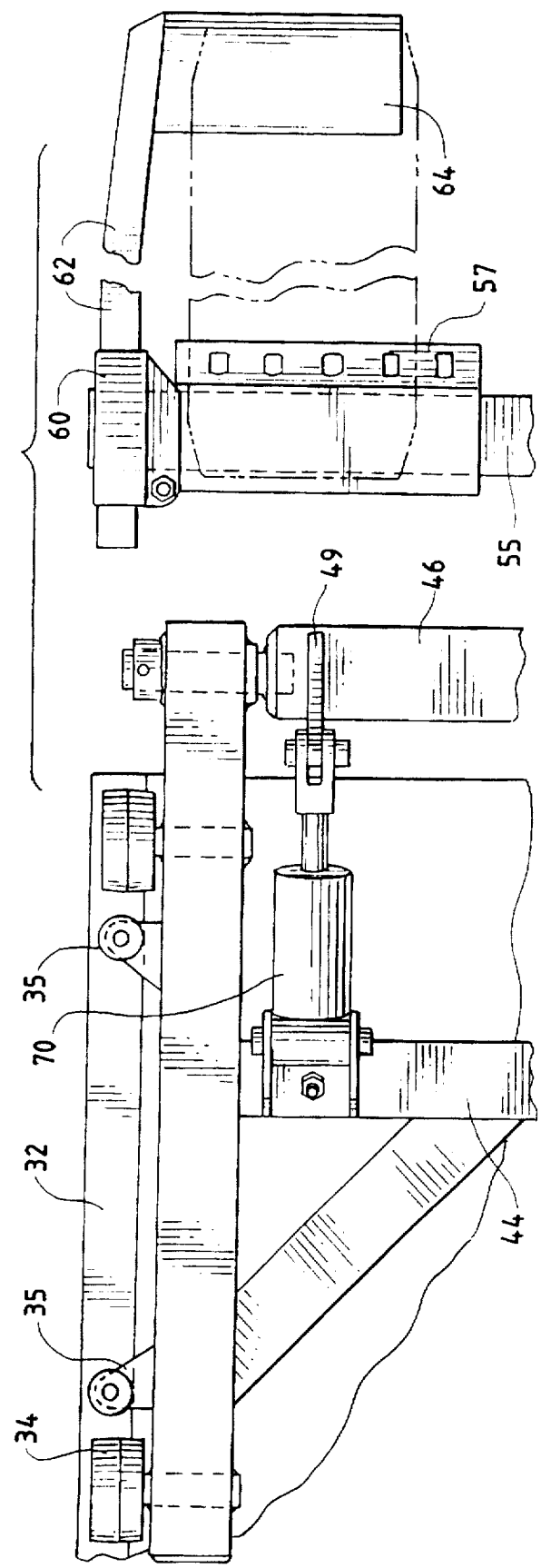

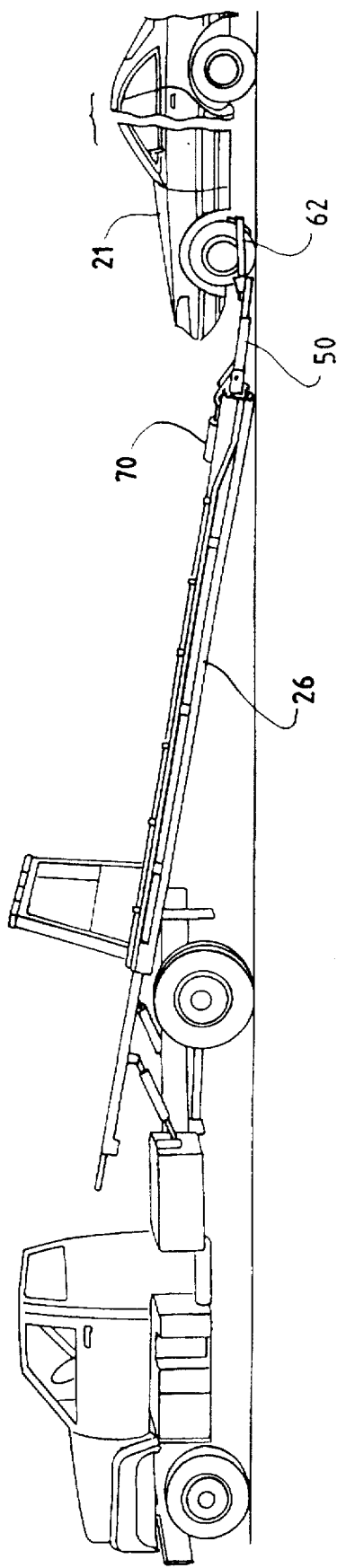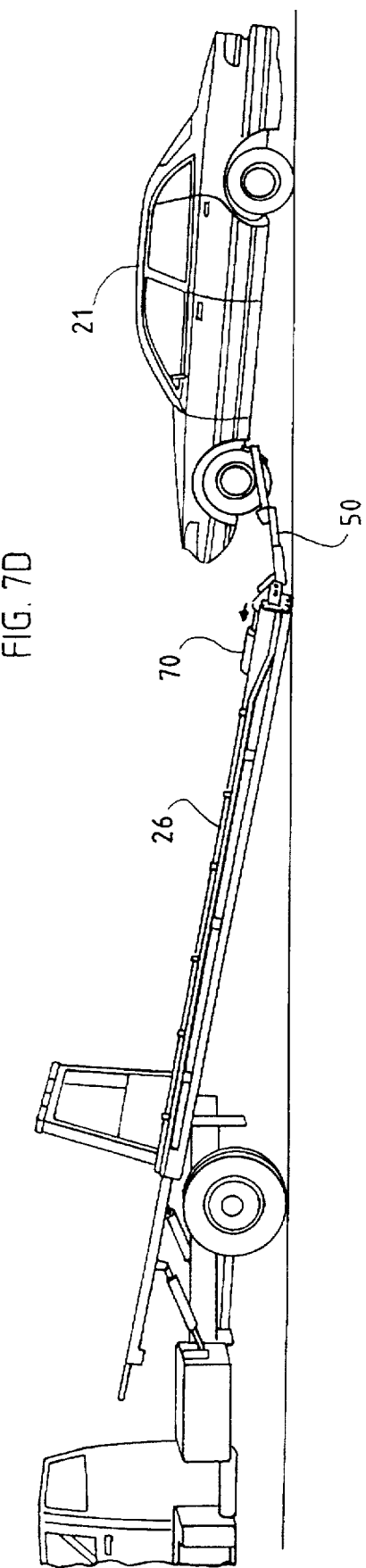

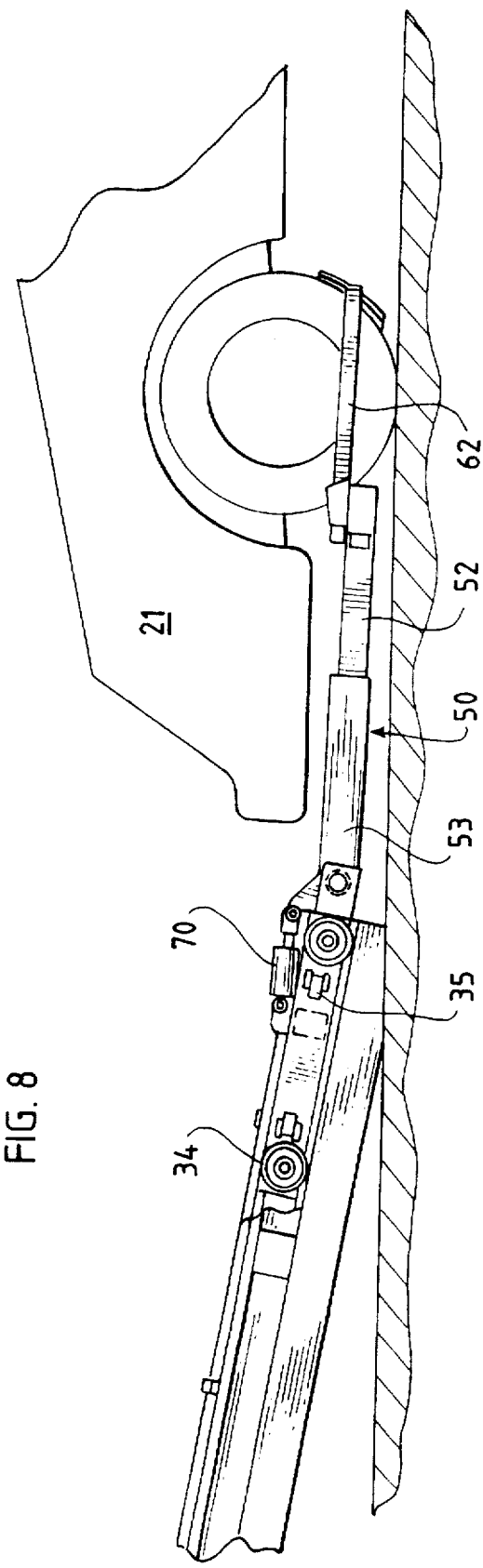
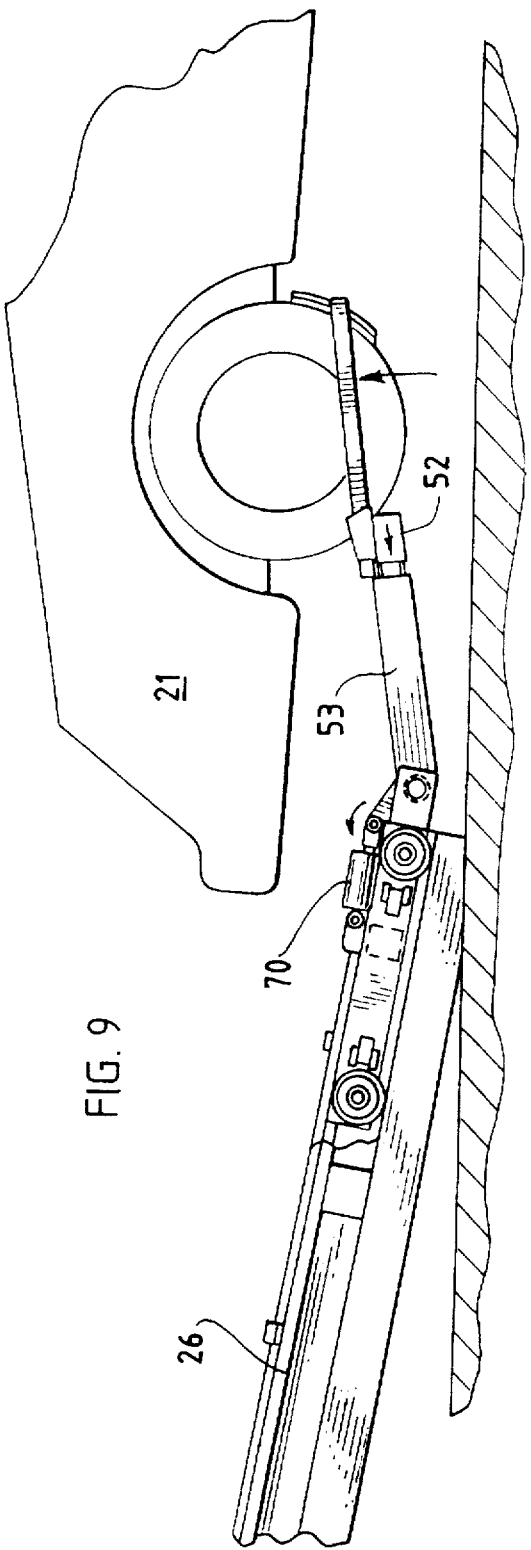
FIG. 8
FIG. 9

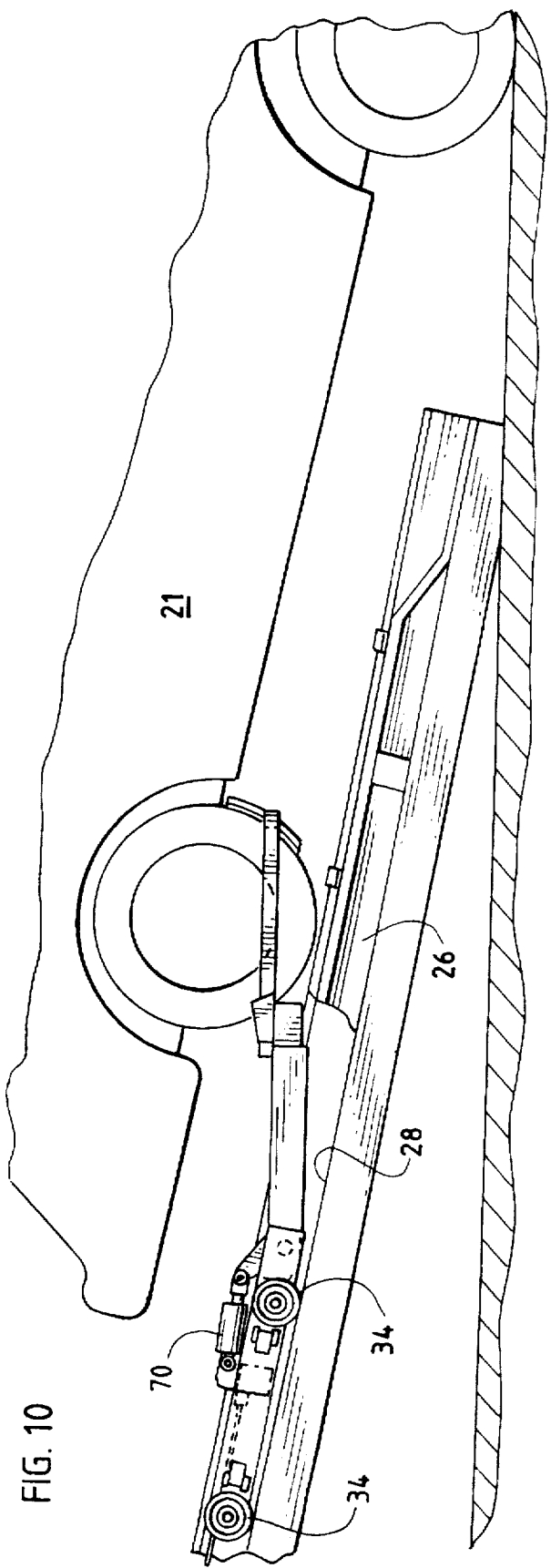
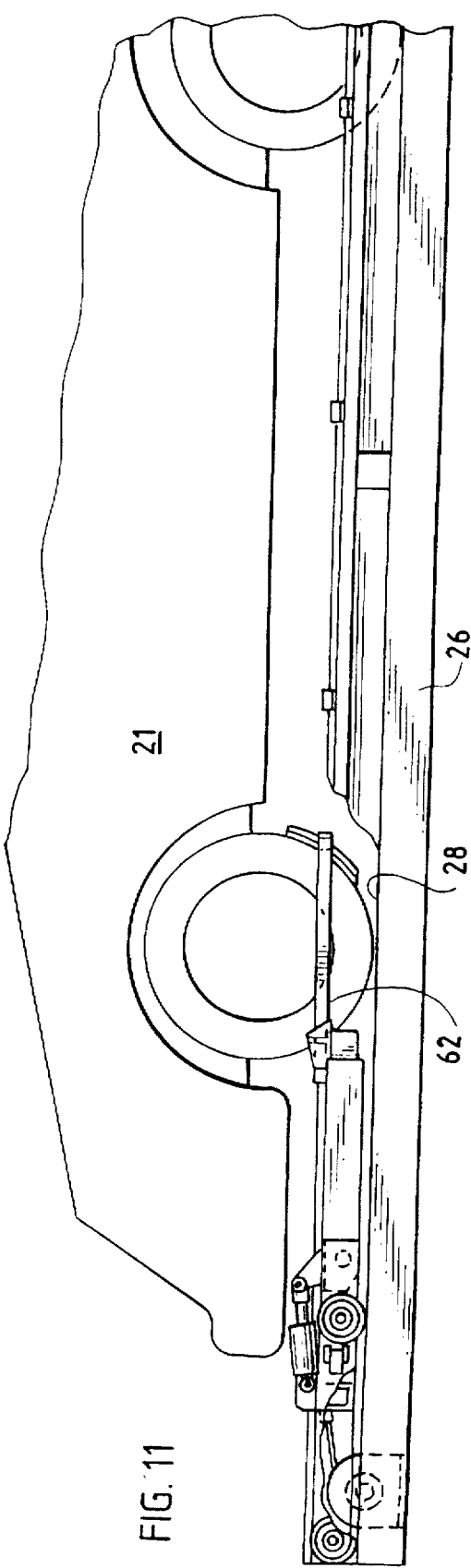
FIG. 10
FIG. 11

TRANSPORTING APPARATUS AND METHOD

This application is a continuation of application Ser. No. 08/306188 filed on Sep. 13, 1994, now U.S. Pat. No. 5,529,454.

BACKGROUND OF THE INVENTION

The present invention relates to a transporting apparatus and method and, more particularly, to a vehicle transporting apparatus, commonly called a "car carrier," which is capable of transporting one or more vehicles in a damage-free manner.

In recent years, the towing industry has experienced a growing interest in vehicle transporting equipment that is versatile in use and capable of carrying a vehicle without risk of damage. As a result, a specific class of equipment, known as car carriers, has become increasingly popular. Such equipment typically includes a platform or deck carried on a truck chassis. The deck is capable of movement from a generally horizontal transport position, over the rear wheels of the truck, to a loading position, in which the deck extends rearwardly from the truck chassis and is downwardly inclined to the ground. In this latter loading position, the deck forms a ramp on which the vehicle to be towed is placed, either by driving it under its own power, by winching, or by other conventional techniques. Examples of such prior art car carriers are shown in U.S. Pat. Nos. 4,795,303; 4,556,357; 4,368,002; 4,239,275; and 3,450,282. U.S. Pat. No. 4,795,303 is hereby incorporated by reference into this application.

There are several disadvantages associated with known prior art car carriers. For example, if the ramp angle (that is, the angle between the deck when in a loading position, and the ground), is relatively large, serious problems may arise. Today's low-profile automobiles can be easily damaged if their lower chassis or body parts engage the deck due to the deck rising too abruptly from ground level. This is likely to occur when the vehicle is winched or otherwise transported up the deck of a car carrier with a relatively large ramp angle.

In other prior art units, the means employed to engage and load a vehicle (such as a J-hook or V-chain) are attached to the vehicle frame or axle, and can damage portions of the vehicle chassis. The winch cable used to load the vehicle onto the deck can cause damage to the underside of the vehicle, as well. Moreover, the chains or slings typically used to engage and load the vehicle require the operator to get down and under the vehicle. This is awkward, time consuming and potentially dangerous.

A still further disadvantage encountered with prior art car carriers is that no effective means has been provided to assist in loading vehicles in which the rolling wheels have been offset or axles have been damaged, or where the tires are flat. As a result, when a vehicle with offset wheels is winched onto the inclined deck, the vehicle has a tendency to move laterally, and it is often difficult to properly position the vehicle in the center of the deck.

Another disadvantage associated with the prior art relates to the means typically used to secure the vehicle to the deck. Operators often use chains attached to the rear of the vehicle in addition to the winch cable hooked to the front. If the winch cable is over-tightened severe frame damage may result.

Yet another disadvantage of the prior art car carriers is the requirement that they be positioned directly in line with the vehicle. This causes problems if, for example, the vehicle is located in close quarters or adjacent to some obstruction.

SUMMARY OF THE INVENTION

The present invention preserves the known advantages of prior art car carrier transporting devices. In addition, it provides new advantages not found in currently available car carriers and overcomes many of the disadvantages of such currently available devices, including those discussed above.

The invention is generally directed to a vehicle transporting apparatus that combines a vehicle lifting system with a car carrier, and includes unique structural features to facilitate the use of such a combination in circumstances and under a wide variety of conditions previously unattained by car carrier transporting devices. The unique combination apparatus of the present invention addresses the need for damage-free towing both when the vehicle is engaged or "hooked up", and when the vehicle is loaded and transported.

In one preferred embodiment, the transporting apparatus of the present invention includes a vehicle chassis and a platform pivotally mounted to the chassis; the platform includes a deck for carrying the transported vehicle. A carriage is mounted on and movable along the platform. A telescoping boom is connected to the carriage, and has a rearward, distal end which supports a wheel lift towing device adapted for engaging and securing the wheels of the vehicle. A power actuator, such as a winch and cable, is provided to move the carriage, boom and wheel lift device, with the vehicle, along the platform. A second power actuator, such as hydraulic cylinders, is adapted to rotate the boom and wheel lift device, to thereby raise the transported vehicle to clear the rear portion of the platform during loading. Further power actuators move the platform from a loading position to the transport position.

A further feature of this embodiment is the use of a wheel lift device which includes a support beam pivotally connected to the boom, two collars pivotally attached to opposing ends of the support beam, and a pair of wheel retainer arms, each of the arms being associated with a corresponding collar. The use of pivoting collars, mounted to opposing ends of a support beam, allows the wheel retainer arms to be both horizontally and vertically moveable, facilitating the engagement and securing of the wheels of a disabled vehicle.

In another preferred embodiment, rather than a wheel lift device, the support beam can include any number of different structures adapted for different uses. For example, the support beam may be configured to engage the vehicle's frame or body, or to accommodate other loads by means of a fork-lift type receiver, for lifting pallets, or a flat platform, for lifting other objects.

In still another preferred embodiment, a platform with a complete deck need not be used; rather, only a partial deck is employed. In this embodiment, the front of the transported vehicle is supported solely by the vehicle lifting apparatus while the rear wheels are supported by a partial deck located toward the rear end of the platform.

In another preferred embodiment of the invention, a method for loading a vehicle using a car carrier system is provided. The method of the present invention embodies the steps of locating a platform in angled orientation adjacent the vehicle to be transported; engaging one end of the vehicle with a vehicle lifting device; rotating the vehicle lifting device to raise the vehicle at one end adjacent to the angled platform; moving the carriage-mounted lifting device with the vehicle up onto the platform; and then rotating the platform into a horizontal, vehicle-transporting orientation. The method of the present invention may also include the step of adjusting the orientation of the vehicle relative to the angled platform as it is moved onto the platform to prevent damage to the underportions of the vehicle.

BRIEF DESCRIPTION OF THE DRAWINGS

The novel features of the invention are set forth in the appended claims. The invention itself, however, together with further objects and attendant advantages thereof, will be best understood by reference to the following description taken in connection with the accompanying drawings in which:

FIG. 3 is a partial perspective view of the apparatus illustrated in FIG. 1 showing further details of the transporting apparatus, carriage, and wheel lift;

FIG. 4 is an exploded perspective view illustrating details of construction of the carriage embodied in the apparatus illustrated in FIG. 1;

FIGS. 5 and 6 are partial side elevation and plan views, respectively, each illustrating further details of the platform, carriage, wheel lift device and powered actuators useful in the embodiment illustrated in FIG. 1;

FIGS. 7A through 7H are side elevational views illustrating the sequence steps to be followed in loading a vehicle for transport;

FIGS. 8 through 11 illustrate the manner in which the apparatus illustrated in FIG. 1 engages the wheels of a vehicle to be transported and how the wheel lift device together with the vehicle are manipulated to properly position the vehicle in the proper transport position.

DETAILED DESCRIPTION OF THE PREFERRED EMBODIMENTS

Figure 1:
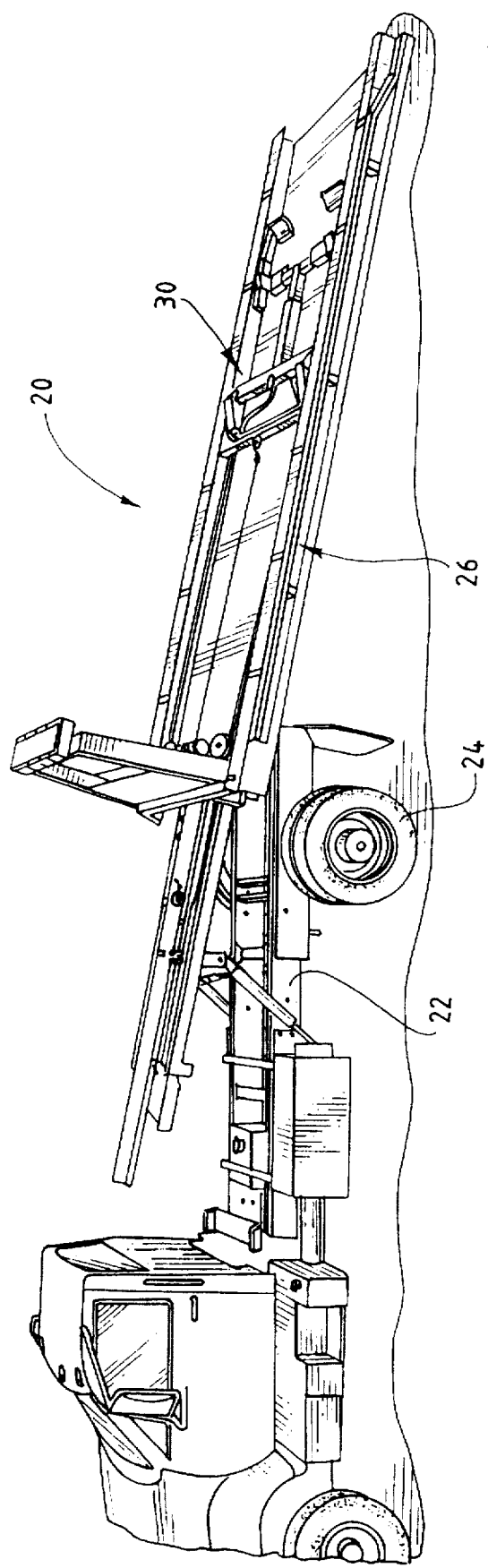
FIG. 1 is a perspective view showing one embodiment of the transporting apparatus of the present invention in the loading position.
Figure 2:
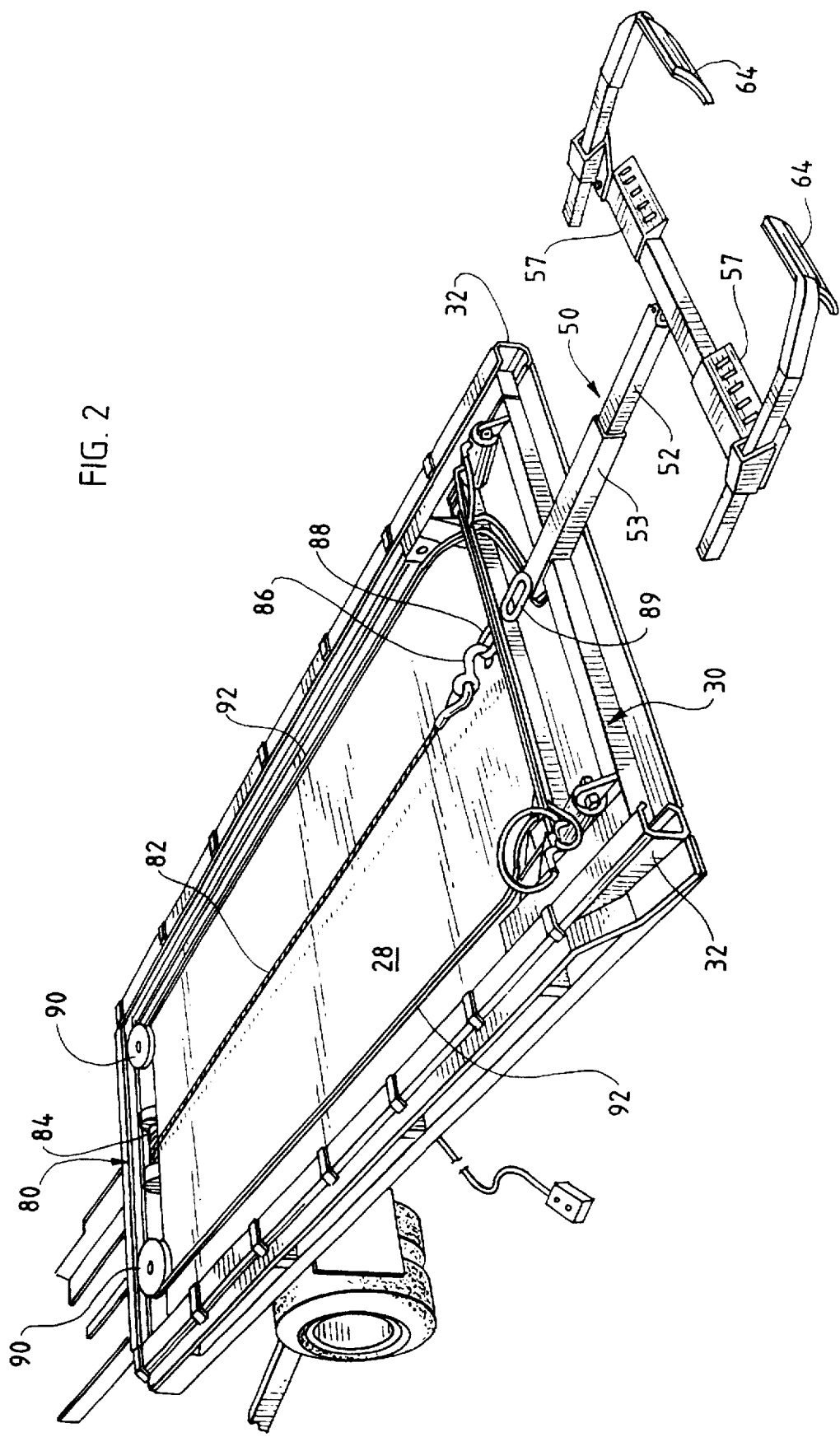
FIG. 2 is a rear perspective view of the transporting apparatus shown in FIG. 1.
Figure 7A:
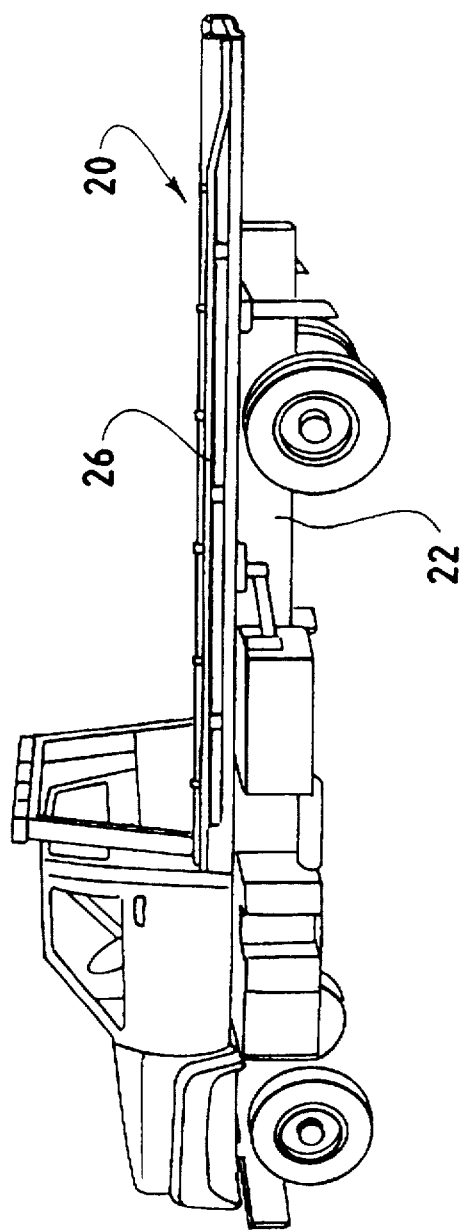
Figure 7B:
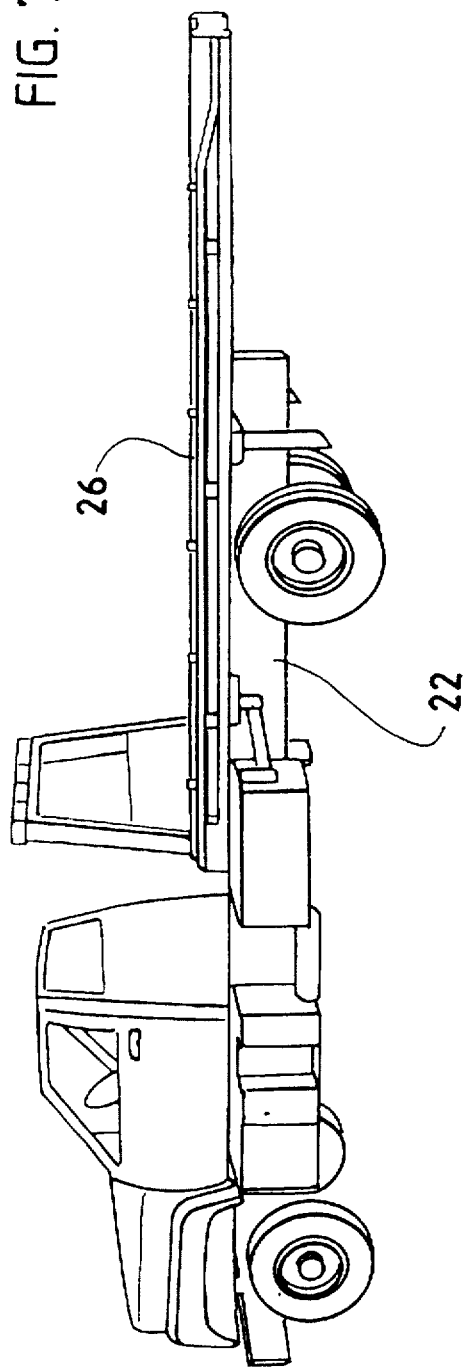
Figure 7E:
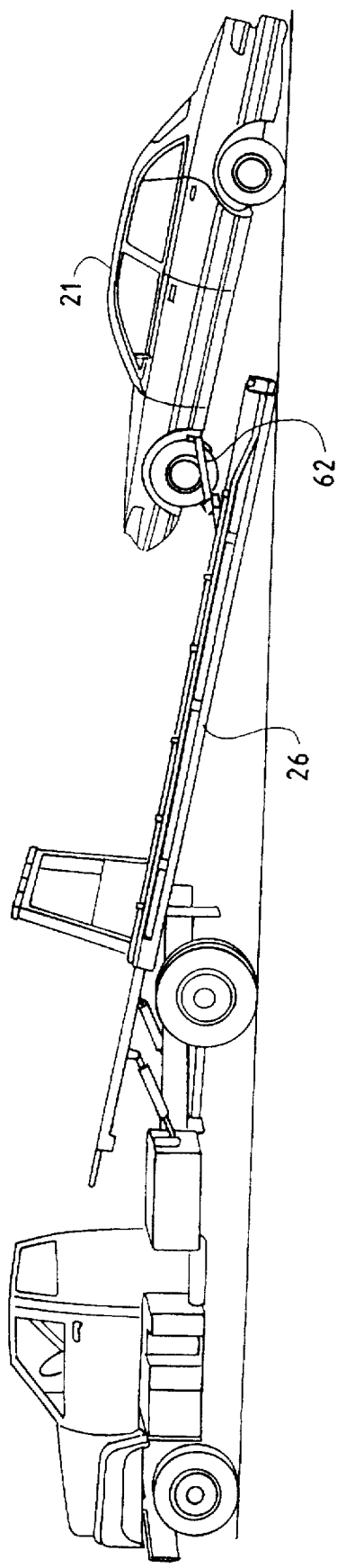
Figure 7F:
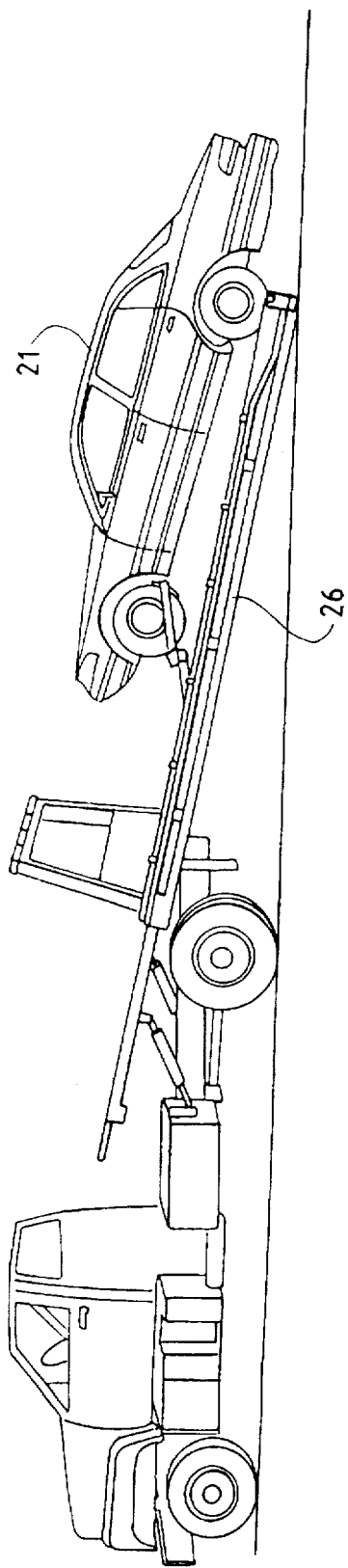
Figure 7G:
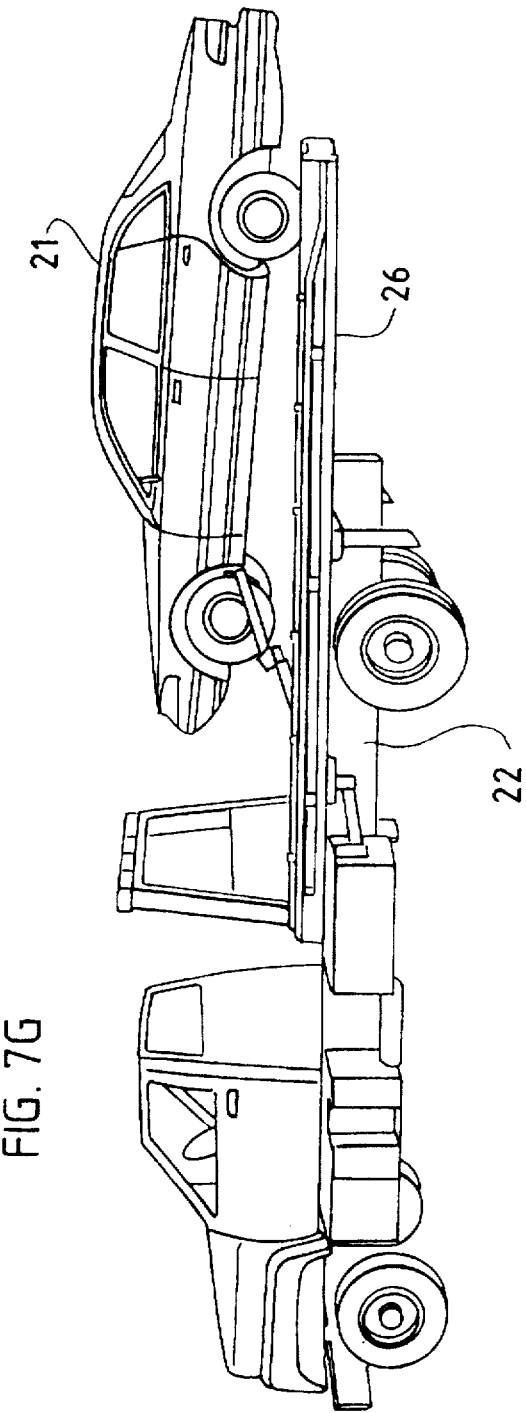
Figure 7H:
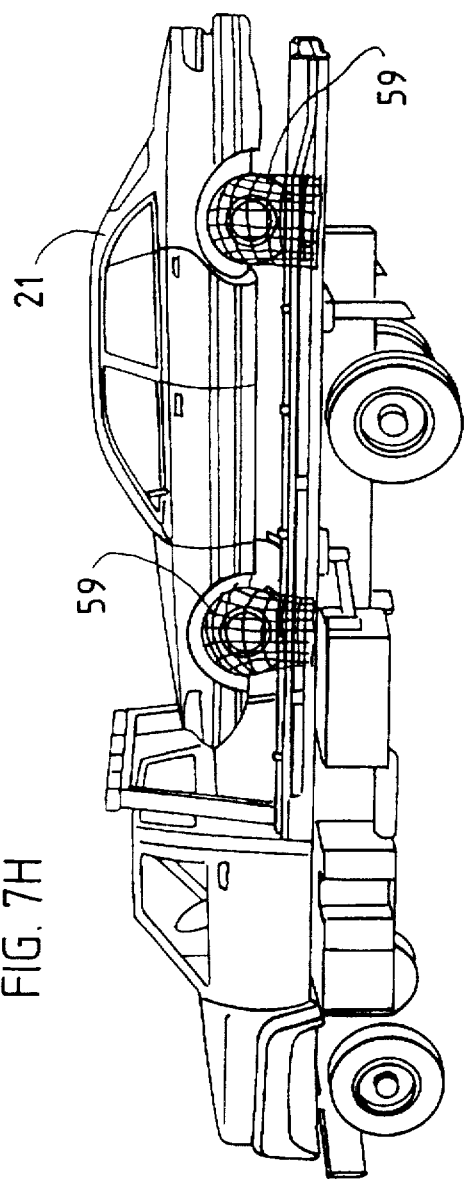

With reference to the drawings and particularly FIGS. 1 and 2, one preferred embodiment of the transporting apparatus of the present invention, designated generally as 20, is shown as it is typically installed onto a transporting vehicle having a chassis 22 and rear wheels 24. The apparatus 20 includes a platform 26 having a deck 28. The platform is mounted in such a manner, as described more fully, for example in U.S. Pat. No. 4,795,303, to permit movement between several different operating positions. Of course, a variety of other mechanical, electrical and hydraulic arrangements well known to those of ordinary skill in the art may be employed to mount the platform 26 to chassis 22. Any of these well known structures or arrangements may be useful in adapting the present invention to conventional transporting vehicles.

The apparatus of the present invention also includes a carriage 30, which is moveable along rails 32. Carriage 30, illustrated more fully in FIGS. 3-6, includes front brace 44, rear brace 46, and side braces 47. (Throughout this specification, the terms "front" or "forward" denote a direction toward the cab of the transporting vehicle and "rear" or "rearward" denote a direction away from the cab.) Two sets of carriage wheels 34 mounted on side braces 47 roll within the "C" channel cross-sections of guide rails 32, which extend along the periphery of the deck and permit the carriage to move up or down the deck. The carriage side wheels 35 are fixed to the outer portion of side braces 47, abut the inner surfaces of guide rails 32, and thus prevent the carriage from swaying or cocking as it moves along the deck 28. Carriage wheels 34 abut the top and bottom portions, 32' and 32", respectively, of guide rails 32. Thus, vertical forces are transmitted from the carriage 30 to guider rails 32 by means of wheels 34, and horizontal or transverse forces are transferred from the carriage to the guide rails by means of wheels 35. A releasable stop (not shown) may be provided on the guide rails at a rearmost portion of the deck, to ensure that the carriage does not inadvertently disengage from the guide rails.

The wheel lift apparatus illustrated in the preferred embodiments of the present invention is designated generally as 51. Rear brace 46 of the carriage supports a telescoping boom 50. Boom 50, comprising inner boom member 52 and outer boom member 53, may be extended or retracted by cylinder 54. Inner boom member 52 is centrally, pivotally attached to a transverse crossarm or support beam 55 at pivot pin 56. Shoes 57 cover opposing outer ends of support beam 55. Tapering collars 60 are pivotally attached to the opposing ends of shoes 57, and permit both horizontal and vertical movement of associated wheel retainers 62. Wheel retainers 62 include wheel plates or grids 64, which can either be curved or straight. Further details of one wheel lift device suitable for use in the present invention are disclosed in U.S. Pat. Nos. 4,637,623 and 4,798,509, each of which is incorporated herein by reference.

As noted above, vehicle lifting structures other than wheel lifting device 51 are contemplated in the practice of the present invention. For example, frame-engaging or axle-engaging forks, or even body-engaging devices, all well known to those of skill in the art, may be employed. However, a wheel-engaging apparatus is preferred since it will typically minimize potential damage to the transported vehicle.

Boom 50 is rotatable so that the vehicle may be raised during loading. To that end, and as shown in FIGS. 3 and 4, cylinders 70 are fixed to front brace 44 at one end, and are fixed to flange 49 on rear brace 46, at their other end. Sleeve 72 is provided within side rail 47. Rear brace 46 is pivotally connected to side rail 47 by pin 74, which is also journalled within a corresponding aperture 76 in rear brace 46. Set pins 78 are insertable into sleeve 72 and rear brace 46, as shown, to fix pin 74 in position. The structure shown in FIG. 4 is of course symmetrical, and identical structure is located on the opposing side of the carriage 30. Thus, as should now be understood, as cylinders 70 retract, flanges 37, rear brace 46 and its associated boom 50 are rotated about pivot pin 74, thereby raising or lowering wheel lift assembly 51.

Winch 80 is positioned at the front portion of platform 26 and includes cable 82 and drum 84. The rear end of cable 82 is fixed to hook 86 or another connecting device, which in turn can be secured to either ring 88 on front brace 44, or ring 89 on rear brace 46. As the winch 80 is activated, the carriage 30 is drawn up deck 28.

The operation of the apparatus constructed as described above is simple and straightforward and is illustrated in FIGS. 7-11. FIGS. 7A and 7B show the transporting apparatus first in its stowed or transport position and then as the platform 26 moves rearward off the chassis 22. FIGS. 7C and 8 show the platform 26 in the vehicle loading position with boom 50 extended so that wheel retainers 62 may be located in a vehicle lifting position adjacent to the wheels of the vehicle 21 to be transported. Boom 50 is then rotated upwardly, through the action of cylinders 70, as illustrated in FIGS. 7D and 9, raising wheel lift assembly 51 and vehicle 21. This pivoting movement assures that the lowermost front portion of vehicle 21 clears the rear portion of deck 28 as vehicle 21 is loaded for transport. Boom 50 can then be retracted so that inner boom 52 is moved forward relative to outer boom 51. Now, winch 80 is actuated and carriage 30 moves up platform 26, along with wheel lift assembly 51 and vehicle 21, as illustrated in FIGS. 7E, 7F and 10. At an appropriate location on the deck, once the lowest portion of the front of the vehicle 21 has cleared the rear of the deck, boom 50 can be permitted to rotate downward so that the front wheels of the vehicle move closer to the deck. This rotation of the vehicle will, in turn, raise the rearmost portion of vehicle 21 to prevent contact with the ground or pavement and concomitant damage. When vehicle 21 has been moved completely on board deck 28, winching ceases, the wheel lift 51 is rotated to lower the vehicle's wheels in contact with deck 28, and platform 26 is pivoted to a generally horizontal position and retracted, placing the vehicle in the transport position, as shown in FIGS. 7G, 7H and 11. Preferably, the vehicle 21 is then further secured to platform 26 and deck 28 by means of suitable netting or straps 59 well known to those of ordinary skill in the art.

Figure 12:
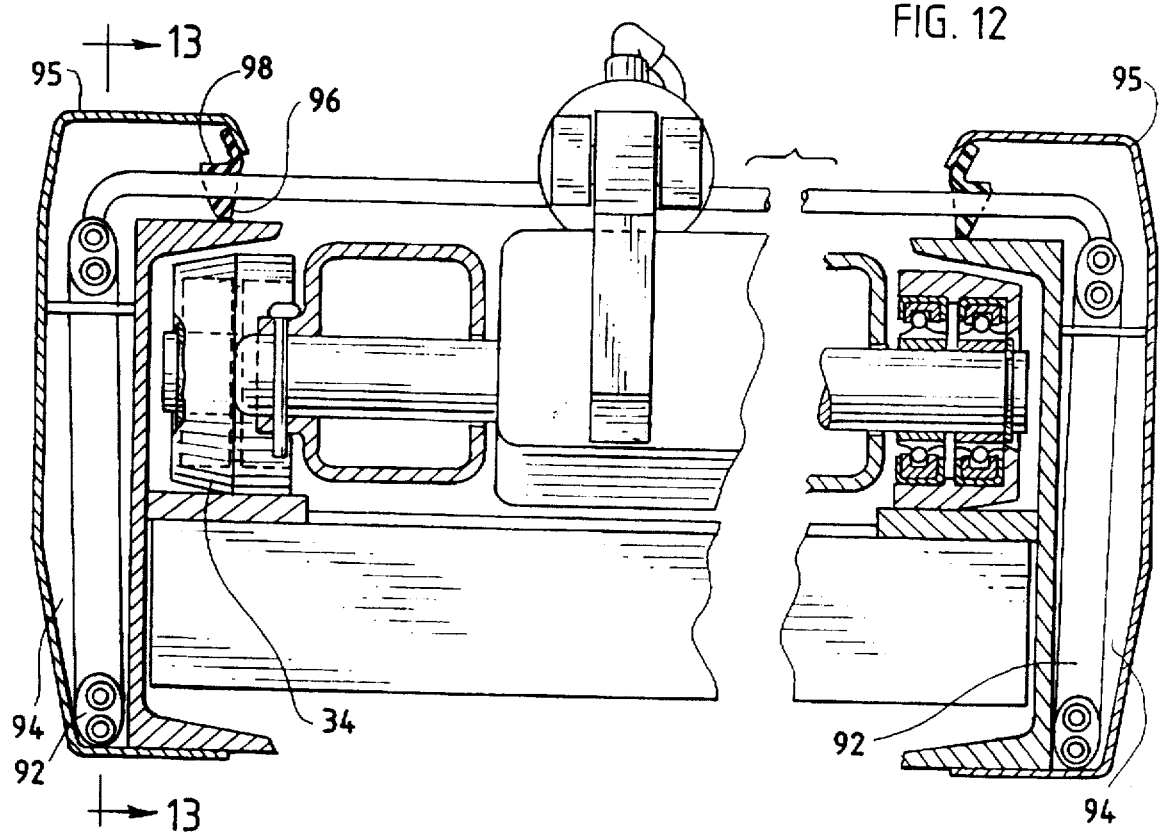
FIGS. 12 through 14 illustrate in transverse and longitudinal cross sections, further details of the carriage and platform structures forming another preferred embodiment for placement and protection of hydraulic lines necessary to operate the wheel lift device.
Figure 13:
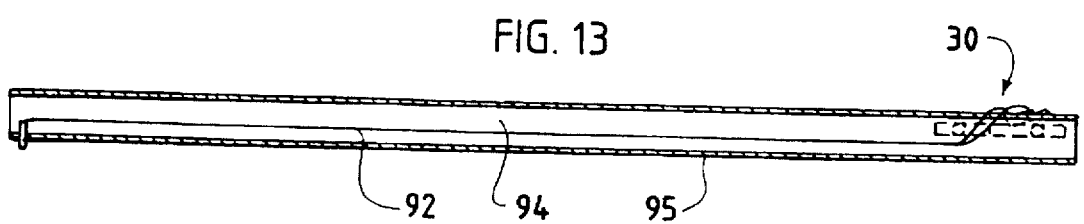
Figure 14:
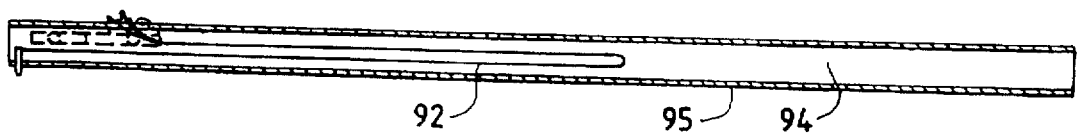

Those of skill in the art will appreciate that the carriage 30 requires hydraulic circuitry connected to cylinders 54 and 70 that can move with carriage 30 along platform 26. Different structures can achieve that goal. For example, FIGS. 1 and 2 illustrate one embodiment utilizing a pair of hydraulic hose reels 90 that play out the necessary hydraulic line 92 as the carriage 30 moves rearward on platform 26. As the carriage moves forward, the reels 90 take up the excess line 92. Alternatively, as illustrated in FIGS. 12-14, hydraulic lines 92 may be threaded in respective side compartments 94 formed by side bumpers 95 extending along the entire length of each side of platform 26. As can be seen in FIG. 13, when the carriage 30 is positioned at the rearward end of platform 26, the hydraulic lines 92 extend linearly along the entire length of compartment 94. As the carriage 26 moves toward the front end of platform 26, hydraulic lines 92 fold over, forming a loop as illustrated in FIG. 14. The hydraulic lines 92 emerge from compartments 94 along an inwardly facing, longitudinally extending slot 96 that runs the length of each compartment. Preferably, the slot 96 is covered by a flexible rubber shield 98 which impedes dirt or other contaminants from entering compartment 94. Of course, because of the use of a flexible shield material, the hydraulic lines can extend through the slot while maintaining the shield in a generally closed position along the remaining length of slots 96.

Those of ordinary skill in the art will understand that carriage 30 described here is only one embodiment of the present invention. Different structures, trolleys or carriages in mother diverse forms, can be used and still accomplish many, if not all, of the objectives of the present invention. So too, other means can be used to move the carriage. For example, a chain and sprocket drive may be employed. Alternatively, a screw drive, hydraulic actuators, gear and pinion or other drive means may be used to move the carriage, or a structure accomplishing its function, along the deck. It is also contemplated that the carriage 30 may be removed from platform 26 to permit use as a conventional carrier.

From the foregoing description of the preferred embodiments, those of skill in the art will appreciate that the present invention overcomes a number of disadvantages with prior art car carriers. For example, the operator need not crawl under the transported vehicle to hook up the carrier. Rather, the wheel retainers 62 may be easily positioned in vehicle-lifting position adjacent the wheels from the sides of vehicle 21. The simplicity and efficiency of hook-up is also a safety consideration, because it minimizes the time when the operator may be in a potentially dangerous location, i.e., along a highway roadside. Moreover, the use of a pivotable, vehicle-engaging cross-arm 55 allows "off-line" positioning of the carrier for hook up where, due to close quarters, the traditional "on-line" hook-up position would not be possible.

Another significant advantage arising from the present invention is the reduction of potential damage to the transported vehicle. By raising the front end of the vehicle and moving the carriage and raised vehicle along the platform and deck, the transported vehicle cannot scrape the deck even when there is a relatively large ramp angle. So too, because the winch cable connects to the carriage in front of the vehicle, there is little possibility of winch cable damage.

Off-center loading problems are also solved by the present invention since the forward wheels of the transported vehicle do not roll along the deck during loading, and offset, flat or otherwise non-functioning wheels will not interfere with proper positioning of the vehicle.

Of course, it should be understood that various changes and modifications to the disclosed preferred embodiments will be apparent to those skilled in the art. Such changes and modifications can be made without departing from the spirit and scope of the present invention and without diminishing its attendant advantages. It is, therefore, intended that such changes and modifications be covered by the following claims.

What is claimed is:

1. A method for loading a vehicle having at least one pair of wheels using a car carrier towing system, comprising the steps of:

positioning a towing vehicle proximate the vehicle to be loaded, the towing vehicle including an inclined platform;

engaging the vehicle to be loaded using a wheel lift device associated with and positioned rearward of the platform, the wheel lift device including rearwardly extending vehicle engaging means and being operable to lift one pair of the at least one pair of wheels of the vehicle to be loaded while the wheel lift device is rearwardly displaced from the platform;

moving the wheel lift device along the platform in a forward direction toward the towing vehicle;

selectively rotating the vehicle engaging means during movement of the wheel lift device along the platform so that the vehicle to be loaded is moved to desired raised or lowered positions; and rotating the platform to a vehicle transporting position, in which the platform and the loaded vehicle are generally horizontal.

* * * * *